RELAXATION OSCILLATOR WITH SAWTOOTH OUTPUT

Filed April 26, 1967

Inventors
WILLIAM E. DRUMMOND
DONALD E. GRIFFEY

By Mueller, Aichele & Rauner

Attys.

United States Patent Office 3,424,998
Patented Jan. 28, 1969

3,424,998
RELAXATION OSCILLATOR WITH SAWTOOTH OUTPUT

Donald E. Griffey, Skokie, Ill., and William E. Drummond, Stanford, Calif., assignors to Motorola, Inc., Franklin Park, Ill., a corporation of Illinois Filed Apr. 26, 1967, Ser. No. 633,817
U.S. Cl. 331—111 2 Claims
Int. Cl. H03k 3/26

ABSTRACT OF THE DISCLOSURE

The oscillator includes a resistor for charging a capacitor at a relatively slow rate, with an electronic switch and an inductor coupled in series across the capacitor. When the capacitor charge reaches a predetermined conduction level, the switch closes and couples the inductor and capacitor together to rapidly discharge the capacitor and charge the inductor. The switch opens sharply after a predetermined amount of inductor charge change to thereby develop a sawtooth signal across the capacitor.

*Background of the invention*

Relaxation oscillators include a resistor to slowly charge a capacitor and a switch which closes when the charge reaches a given value to rapidly discharge the capacitor. The switch opens again after a preselected amount of discharge and this operation continues in repetitive fashion to develop a sawtooth signal. The switch may be a semiconductor device the current handling capabilities of which largely depend upon its cost and size. During the rapid discharge of the capacitor, high currents may flow, so that, in order to preclude damage to the device, it must either be large and expensive to handle the current or some means such as a resistor must be provided to limit the current. The former is, of course, undesirable and the latter may have adverse effects in certain applications.

Such effects are particularly noticeable in television receivers where such an oscillator may be employed to provide a sawtooth current in the vertical deflection yoke which encircles the cathode ray tube. During the slowly increasing or trace portion of the sawtooth signal, when the capacitor is being charged, the cathode ray beam is scanned across the face of the tube to provide an image. During the discharge or retrace portion, the cathode ray beam is rapidly swept back to commence a new scan. Synchronizing pulses applied to the oscillator close the switch at the same time during each cycle to synchronize the sawtooth signal with the transmitted signal. In order to insure accurate images, the switch must open in preparation for the next scan at the same time in each cycle. If the capacitor discharges along a non-linear curve, which is the case when a resistor is used to limit the current, there will be a time during which the electronic switch is on the verge of opening and is, therefore, particularly susceptible to being opened by extraneous pulses. Since such pulses are random, the switch may open at a different time in each cycle so as to either lose some picture information or to undesirably permit vertical jitter to show on the cathode ray tube screen.

Due to this heretofore unsolved problem arising in relaxation oscillators, present day vertical deflection systems generally use a multivibrator type oscillator or the like where feedback is coupled from the output amplifier stage back to a transistor, for example, to regeneratively turn the transistor on and off. In such case, however, a horizontal frequency signal in the horizontal yoke may be magnetically coupled to the vertical yoke and from there directly back to the oscillator via the feedback path to adversely affect the vertical frequency. In addition, the loading presented to the synchronizing pulses will be affected by the characteristics of the output amplifier stage so a sto affect the pull-in range of the oscillator.

An additional disadvantage of some presently used oscillators is the fact that the hold control which affects the frequency of the sawtooth signal changes the size of the raster even when the sawtooth signal is in synchronization.

*Summary of the invention*

An object of the invention is to provide a synchronized relaxation oscillator with improved insensitivity to extraneous pulses.

Another object is to provide an oscillator for television deflection systems which is isolated from the output circuitry.

Another object is to provide a hold control to adjust the frequency of the sawtooth signal but does not affect the raster size when the signal is in synchronization.

A further object is to employ inexpensive transistors in a relaxation oscillator in a manner such that excessive currents are not drawn.

The relaxation oscillator, according to the invention, includes a capacitor and a resistor coupled in series to a DC potential supply and apportioned to cause the rate of potential increase across the capacitor to be relatively slow. An electronic switch, in the form of regeneratively coupled complementary transistors, and an inductor are serially coupled across the capacitor, with the switch responsive to the potential on the capacitor exceeding a reference voltage by a predetermined amount to close and thereby couple the inductor and capacitor together to discharge the capacitor. When the current through the inductor reaches and quickly passes through a cutoff level, the switch sharply opens again. The inductor and the capacitor are tuned to a frequency selected to cause the discharge time to be relatively fast. The sawtooth signal thereby developed across the capacitor is coupled to a utilization circuit.

*Detailed description of the preferred embodiments*

Figure 1:
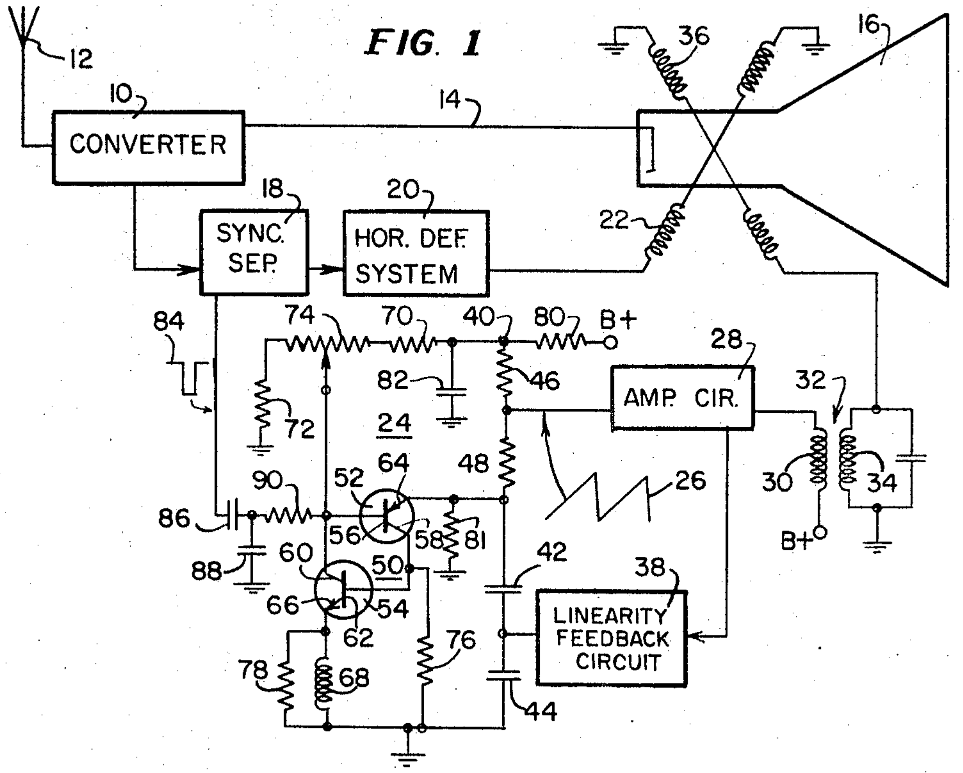
FIG. 1 illustrates a television receiver partially in block and partially in schematic incorporating the features of the invention.

Referring now to FIG. 1, the television receiver therein shown includes a converter 10 which may be of known construction for receiving radio frequency signals at antenna 12 and converting the same into video signals on conductor 14 for application to cathode ray tube 16. A synchronizing signal separator circuit 18 is coupled to converter 10 to derive horizontal synchronizing pulses for application to horizontal deflection system 20 which in turn applies a sawtooth wave current to horizontal deflection yoke 22. In addition, the horizontal deflection system includes means to provide high voltage to the final anode of cathode ray tube 16.

Synchronizing signal separator circuit 18 also provides vertical synchronizing pulses for application to a vertical relaxation oscillator 24. The synchronized vertical sawtooth signal 26 from such oscillator is amplified by amplifier circuit 28 and appears across the primary winding 30 of a transformer 32. The signal is coupled to its secondary winding 34 for application to vertical deflection yoke 36 to cause a sawtooth current to flow therethrough for vertical scan of the cathode ray beam. To insure linearity in the yoke 36, a feedback circuit 38 couples a portion of the sawtooth wave signal back to the input of amplifier circuit 28.

The oscillator 24 includes a DC potential supply at junction 40 to charge a pair of serially coupled capacitors 42 and 44 through resistors 46 and 48. The RC apportionment is such as to cause the rate of potential increase across the capacitors to be relatively slow and thereby form the slow rising trace portions of sawtooth signal 26. The electronic switch 50 in oscillator 24 includes a PNP transistor 52 and an NPN transistor 54 in which the base 56 and collector 58 of the transistor 52 are cross coupled to the collector 60 and base 62 of the transistor 54 with the terminals of the switch comprising emitters 64 and 66 of the respective transistors. An inductor 68 is coupled between emitter 66 of transistor 54 and ground, with the series switch-inductor combination being coupled across the capacitors 42 and 44.

A pair of resistors 70 and 72 and a consumer accessible hold potentiometer 74 are coupled in series between the junction 40 and ground. The movable arm of potentiometer 74 is coupled to the junction of base 56 and collector 60, which junction may be referred to as a control electrode, to provide a fixed reference or bias voltage for the electronic switch 50. As the potential across capacitors 42 and 44 increases due to the charging currents through resistors 46 and 48, the voltage on emitter 64 of transistor 52 increases with respect to the reference voltage on base 56 to approach a value to bias on the transistor. When transistor 52 begins to turn on, the voltage across resistor 76 increases which increases the base-emitter bias of transistor 54 to turn it on and it will reduce the voltage on base 56 so that transistor 52 conducts harder. This regenerative action leads to rapid saturation of both transistors so as to present a low impedance between emitters 64 and 66 or, in other words, close the electronic switch 50.

At this time, the inductor 68 and the capacitors 42 and 44 are coupled together to form a resonant circuit which rings at the resonant frequency thereof. This causes the capacitors to discharge and charge the inductor towards the cutoff level of the switch 50, that is, the current through emitter 66 approaches a value to reduce the bias of transistor 54 which reduces the bias on transistor 52. This regeneration action leads to rapid cutoff of both transistors so as to provide the rapidly decreasing retrace portions of the sawtooth signal 26. Now the capacitors 42 and 44 begin to charge again, with this operation being continued in cyclical fashion. The resonant frequency as determined by the values of the inductor and the capacitors is selected so that the inductor will charge to a value to cut off the switch 50 before retrace is completed, that is, on the order of 190 microseconds although preferably the frequency should be somewhat higher to insure that discharge does not extend beyond the equalizing pulses which follow the vertical synchronizing pulse.

The inductor helps to limit the peak currents which are drawn through the electronic switch 50 during discharge of the capacitors and thus the transistors 52 and 54 need not have high current handling capabilities. A resistor 78 is coupled across the inductor 68 to damp the same so that it does not ring for more than on the order of a half cycle. This resistor also serves to limit the peak currents drawn through the transistors. The supply potential at junction 40 is developed by the voltage divider action of resistor 80, resistors 70 and 72 and potentiometer 74 from B+ to ground. The resistors 46, 48 and a transistor protection resistor 81 from the emitter 64 of transistor 52 to ground do not appreciably affect the potential at junction 40 because of their relatively large values whereas the resistance of the switch 50 between base 56 and ground does have some effect.

A bypass capacitor 82 connected to junction 40 removes any AC component that may appear thereat.

Negative-going synchronizing pulses 84 from synchronizing signal separator circuit 18 are coupled through a divider network consisting of capacitors 86 and 88 and a resistor 90 to the base 56 of transistor 52 to close the switch 50 at predetermined intervals and thereby fix the frequency of the sawtooth wave signal 26. By adjusting the movable arm of the hold potentiometer 74, the reference voltage on base 56 may be changed to affect the time for which the electronic switch 50 is opened and thereby affect the trace frequency of signal 26. If the adjustment of potentiometer 74 is such that the oscillator trace frequency is not the same as the vertical frequency, the synchronizing pulses 84 will override the reference voltage and close the switch 50 so that even though the consumer incorrectly adjusts hold potentiometer 74, he cannot affect the frequency. This, of course, is only true within limits because if the reference voltage is far enough off, the amplitude of the synchronizing pulses will be insufficient to override the reference voltage. To at least partially preclude this, the resistors 70 and 72 limit the range the reference voltage can be changed and in addition, limit the bias voltage to a value which cannot destroy the transistors. It may appear that adjustment of potentiometer 74 can affect the peak-to-peak amplitude of signal 26 and therefore affect the size of the raster. However, as long as the amplitude of the synchronizing pulse is sufficient to override the reference voltage, adjustment of potentiometer 74 will not change the duration of the trace portion and since the slope of the trace portion remains the same, the peak-to-peak amplitude and therefore the raster size is constant. The relaxation oscillator 24 has the further advantage that the synchronizing pulses, if positive, may be applied to the top of resistor 76. Thus the circuit is compatible with positive or negative sync without complicated circuit changes.

Figure 2:
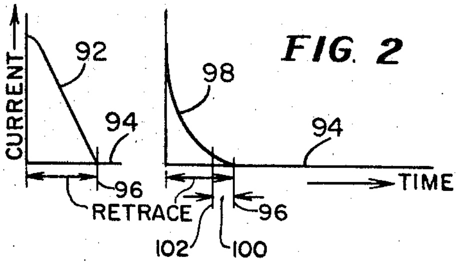
FIG. 2 shows the waveforms which open the electronic switch of FIG. 1.

To explain the advantage of the inductor 68, reference is made to FIG. 2 in which waveform 92 illustrates the current variation through inductor 68 and resistor 78 during retrace resulting from the discharge of capacitors 42 and 44. When the current reaches cutoff level 94, the bias of transistor 54 is reduced to a point where the transistor becomes non-conductive to turn off the switch 50 as previously explained. It will be noted that the current goes through the cutoff level 94 quite rapidly so that turn-off is sharp and precisely at the required cutoff time 96. Suppose, however, that the inductor 68 is not used and is replaced by a resistor of a high enough value to reasonably limit current. Now the waveform 98 which depicts the current through emitter 66 has a relatively flat slope near the cutoff level 94, where the switch is on the verge of opening so that there is a duration 100 (merely illustrative) during which the oscillator 24 is quite susceptible to being opened by an extraneous pulse, for example, at time 102 rather than the required cutoff time 96.

Figure 3:
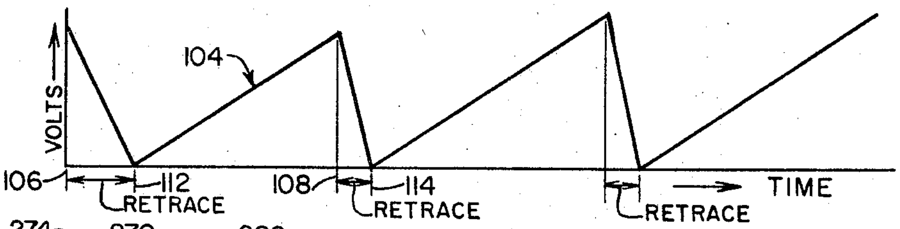
FIG. 3 shows the effects that the waveforms of FIG. 2 have on the sawtooth signal developed in the receiver of FIG. 1.

Reference is made to FIG. 3 which shows a sawtooth signal 104 and the effect thereon due to the oscillator's susceptability to extraneous pulses. At times 106 and 108, the vertical synchronizing pulses 84 close the switch 50 to discharge the capacitors 42 and 44. If the discharge element is a resistor so that the current through emitter 66 has the appearance of waveform 98 of FIG. 2, an extraneous pulse at time 112 opens the switch and the capacitors begin to charge again as shown in the first cycle of the sawtooth signal 104. If it could be assured that these extraneous pulses occur at the same time in each cycle then the sawtooth signal would experience no deleterious effects. However, this is not the case because such pulses may occur at random times. Thus, during the second cycle, a pulse may appear at time 114 to open the switch 50 and it is assumed that the retrace duration between times 106 and 112 is larger than the duration between times 108 and 114. The slope of the trace portion remains unaffected by the time the switch is opened so that during the first cycle, the peak-to-peak voltage of the trace portion is less than the peak-to-peak voltage of the second cycle trace portion. Such peak-to-peak voltages may continually vary for successive vertical scans so that either some picture information is lost or black retrace lines will appear on the cathode ray tube screen.

On the other hand, when the inductor 68 is inserted between the emitter 66 and ground so that the current through the emitter 66 has the appearance of the waveform 92 of FIG. 2, the switch 50 will turn off precisely at time 96 during each vertical scan and as shown by the second and third cycles of the signal 104, the peak-to-peak amplitude does not change.

The oscillator 24 is self-contained and does not require feedback from the amplifier circuit 28 whereas in multivibrator-type oscillators generally used in vertical deflection systems such feedback is necessary. Feedback has the disadvantage that horizontal signals in the horizontal yoke 22 may be inductively coupled to the vertical yoke 36 back into the amplifier circuit 28 and through the feedback path into the oscillator 24 so as to adversely affect the vertical frequency. Here, however, the oscillator is self-contained so that there is isolation between it and the amplifier circuit 28 and therefore feedback from the horizontal system or other extraneous signals is minimized. Also, such isolation precludes the circuit 28 from undesirably loading the synchronizing pulses to reduce the pull-in range of the oscillator.

Figure 4:
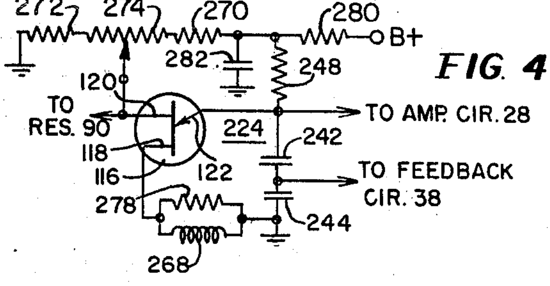
FIG. 4 illustrates a second embodiment of the invention.

A second embodiment is shown in FIG. 4 where corresponding components are labeled with the same reference numeral plus a factor of 200. The oscillator includes a unijunction transistor 116 having a first base 118 connected to the inductor 268. A second base 120 is connected to the potentiometer 274 and to the synchronizing signal separator circuit through resistor 90. When the voltage across capacitors 242 and 244 charges up through resistor 248 to a value relative to the reference voltage on base 120, the transistor fires, and the impedance between the first base 118 and the emitter 122, is very low so that the capacitors can discharge. The rest of the operation is similar to that explained with reference to FIG. 1.

In a circuit of practical construction, the following components and values were used in the circuit of FIG. 1.

| | | |
|---|---|---|
| Capacitor **42** | microfarads | 2.2 |
| Capacitor **44** | do | 2.2 |
| Resistor **46** | ohms | 82,000 |
| Resistor **48** | do | 1,200 |
| Transistor **52** | | [1] M4910 |
| Transistor **54** | | [1] M4933 |
| Inductor **68** | millihenrys | 1 |
| Resistor **70** | ohms | 22,000 |
| Resistor **72** | do | 3,300 |
| Potentiometer **74** | do | 0–3,000 |
| Resistor **76** | do | 6,800 |
| Resistor **78** | do | 39 |
| Resistor **80** | do | 39,000 |
| Resistor **81** | do | 82,000 |
| Capacitor **82** | microfarads | 5 |
| Capacitor **86** | do | .047 |
| Capacitor **88** | do | .012 |
| Resistor **90** | ohms | 10,000 |

[1] Motorola.

What has been described, therefore, is an improved relaxation oscillator adaptable for use in a television deflection system. The oscillator has maximum isolation between it and the output amplifiers, constant size with changes in the hold control when the oscillator is synchronized, and a sharp retrace completion to minimize the susceptibility of the oscillator to extraneous pulses.

We claim:

1. A relaxation oscillator including in combination; direct current potential supply means, capacitor means and resistor means for voltage charging said capacitor means serially coupled to said supply means and apportioned to cause the rate of charge to be relatively slow, electronic switching means and inductor means serially coupled across said capacitor means, means to provide a reference voltage for said switching means, said switching means responsive to the voltage across said capacitor means exceeding said reference voltage by a predetermined amount to be closed and thereby couple said inductor means and said capacitor means together to form a resonant circuit to discharge said capacitor means and charge said inductor means towards a level to sharply open said switching means, said inductor means and said capacitor means tuned to a frequency selected to cause the rate of discharge to be relatively fast, further resistor means coupled in shunt with said inductor means to limit the current in said switching means and to damp said resonant circuit, whereby a sawtooth signal is developed across said capacitor means, and utilization means for said signal coupled to said capacitor means.

2. In a vertical deflection system for energizing a deflection yoke with a sawtooth signal having trace and retrace portions, as oscillator system including the combination of; a potentiometer connected to direct current potential supply means, resistor means and capacitor means serially connected from said potentiometer to a reference point for charging said capacitor means at a relatively slow rate thereby providing the trace portion of the sawtooth signal, an electronic switching device having control electrode means and a pair of output electrodes, one of said output electrodes coupled to the intercoupling of said capacitor means and said resistor means, impedance means including a current limiting resistance coupled between the other of said output electrodes and the reference point, said potentiometer including a variable tap coupled to said control electrode means to provide a reference voltage for said switching means and a frequency setting for said oscillator, an input circuit coupled to said control electrode means to provide synchronizing pulses for said oscillator, said switching means responsive to the voltage across said capacitor means exceeding a given level to render said switching means conductive and provide a low impedance path between said output electrodes whereby said capacitor discharges through said impedance means to lower the voltage across said output electrodes and cause cutoff of said switching means to establish the retrace portion of the sawtooth signal, and a sawtooth utilization circuit coupled across said capacitor means.

References Cited

UNITED STATES PATENTS

| | | | |
|---|---|---|---|
| 3,206,694 | 9/1965 | Bates | 331—172 X |
| 3,218,793 | 11/1965 | Walton | 331—111 X |
| 3,311,847 | 3/1967 | Smeulers | 331—20 X |

OTHER REFERENCES

R. A. Stasior et al., "Notes on the Application of the Silicon Controlled Switch," General Electric Application Note 90.4, April 1962, pages 1, 2, 5, 27.

JOHN KOMINSKI, *Primary Examiner.*

S. H. GRIMM, *Assistant Examiner.*

U.S. Cl. X.R.

331—151, 153, 172.